United States Patent
Hendriks et al.

(10) Patent No.: US 8,248,725 B2
(45) Date of Patent: Aug. 21, 2012

(54) SYSTEM AND METHOD TO ELECTRICALLY GROUND FLUID DYNAMIC BEARINGS

(75) Inventors: Ferdinand Hendriks, Morgan Hill, CA (US); Albert J. Wallash, Morgan Hill, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1081 days.

(21) Appl. No.: 11/973,664

(22) Filed: Oct. 9, 2007

(65) Prior Publication Data

US 2009/0092345 A1   Apr. 9, 2009

(51) Int. Cl.
*G11B 17/02* (2006.01)
*G11B 33/14* (2006.01)

(52) U.S. Cl. ............... 360/99.08; 360/97.12; 360/99.16; 360/99.2

(58) Field of Classification Search ............... 360/97.02, 360/97.03, 98.07, 99.08, 97.11, 97.12, 99.16, 360/99.2, 323
See application file for complete search history.

(56) References Cited

U.S. PATENT DOCUMENTS

| | | | |
|---|---|---|---|
| 966,009 A | 1/1978 | Gardineer, Jr. et al. | |
| 4,101,945 A * | 7/1978 | Butsch | 360/99.04 |
| 4,673,997 A | 6/1987 | Gowda et al. | |
| 5,430,590 A | 7/1995 | Ainslie et al. | |
| 5,473,484 A | 12/1995 | Dunfield et al. | |
| 5,729,404 A * | 3/1998 | Dunfield et al. | 360/99.08 |
| 5,783,882 A | 7/1998 | Brezoczky et al. | |
| 5,844,748 A | 12/1998 | Dunfield et al. | |
| 5,886,854 A * | 3/1999 | Diaz et al. | 360/99.08 |
| 6,018,442 A | 1/2000 | Verbunt et al. | |
| 6,029,978 A | 2/2000 | Pelstring et al. | |
| 6,250,808 B1 | 6/2001 | Ichiyama | |
| 6,335,310 B1 * | 1/2002 | Suekuni et al. | 508/409 |
| 6,378,874 B1 | 4/2002 | Dorulla | |
| 6,512,654 B2 | 1/2003 | Teshima | |
| 6,664,687 B2 | 12/2003 | Ichiyama | |
| 7,178,983 B2 | 2/2007 | Shindo et al. | |
| 7,180,703 B1 | 2/2007 | Subrahmanyam et al. | |
| 2005/0068667 A1 * | 3/2005 | Burns et al. | 360/99.08 |

FOREIGN PATENT DOCUMENTS

| | | |
|---|---|---|
| JP | 2001115180 | 4/2001 |
| JP | 2002191152 | 7/2002 |
| JP | 2004180448 | 6/2004 |
| SU | 1522282 A * | 11/1989 |
| SU | 1649612 A * | 5/1991 |

OTHER PUBLICATIONS

Translation of SU 1522282 A1 (Machenis) Nov. 15, 1989.*
Translation of SU 1649612 A1 (Machenis) May 15, 1991.*

(Continued)

*Primary Examiner* — Craig A. Renner

(57) ABSTRACT

A spindle motor assembly that utilizes a fluid dynamic bearing electrically grounded to provide a conductive path through the spindle motor assembly. In one embodiment, the fluid dynamic bearing includes a liquid metal that is conductive and of low electrical resistance that provides the conductive path between the spindle and the spindle housing.

8 Claims, 5 Drawing Sheets

OTHER PUBLICATIONS

Suk, Mike "Effect of Tribocharging on Lubricant Redistribution", *IEEE Transactions on Magnetics*, vol. 41, No. 2, (Feb. 2005),831-835.

Wallash, Albert J., "Electrostatic Discharge and Electrical Breakdown Study of the Head-Disk Interface in a Hard Disk Drive", *IEEE Transactions on Magnetics*, vol. 40, No. 3, (May 2004),1751-1755.

Zhu, Li-Yan "ESD Damage by Directly Arcing to a MR Head", *EOS/ESD Symposium*, (1999),4B.2.1-4b.2.6.

Blount, Walker C., "Noise Reduction Using Dampening in Voice Coil Motors/ Actuators of Hard Disk Drives", *IBM Storage Technology*, (Oct. 2001),1-6.

\* cited by examiner

SYSTEM AND METHOD TO ELECTRICALLY GROUND FLUID DYNAMIC BEARINGS

TECHNICAL FIELD

Embodiments of the present invention are generally related to the field of direct access data storage devices.

BACKGROUND ART

Hard disk drives (HDD) contain magnetic transducers that magnetize recording media and sense the magnetic field of a rotating disk. The hard disk drive design must constantly evolve to meet the increasing demand of computer applications and configurations. One component of the HDD design that has had to evolve is the spindle motor bearing. The spindle is a rod-like axle inside a HDD. The disks inside the HDD are center mounted on the spindle and the spindle and the spindle motor rotates the spindle and the disks. In the past, the majority of HDDs implemented ball bearing spindle motors. However, the HDD industry is now using a different type of bearing design known as Fluid Dynamic Bearing (FDB).

FDB spindles are used because FDB spindles have significantly less runout, larger damping and lower acoustic noise. As head-disk separation diminishes and the sensitivity of recording transducers increases, the effects of spurious charge buildup caused by friction becomes an increasing concern. In the conventional HDD illustrated in FIG. 1A, the head to disk electrical breakdown due to inadequate grounding of the disk rotation leads to electrical noise on the disk coupling to the reader thereby increasing the bit error rate. In the illustration in FIG. 1A, the thermal fly-height control (TFC) of the HDD is turned off and an electrical breakdown is more likely to occur between the disk and the read sensor thereby damaging the reader. In the example shown in FIG. 1B, the TFC is turned on leading to an electrical breakdown as more likely to occur between the reader/shield and the disk. The presence of high-frequency noise transients of the disk can also degrade the bit error rate performance of the HDD.

There are several mechanisms that raise the electrical potential of the disk relative to the head. First, induced voltage from the spindle motor winding, tribocharge from the fluid dynamic bearing oil, and/or the tribocharging of the spindle due to internal rubbing on the motor.

In disk drives, the tribocharging system is complicated and involves multilayers of metal and insulators, a thin lubricant layer and complex contact surfaces. Tribocharging of the interface between the head and disk contributes to a voltage build up on the head when the disk is accelerating or decelerating. In order to solve the tribocharging and other electrostatic problems, special additives are added to the fluid dynamic bearing oil. However, this affects the performance of the fluid dynamic bearing and generally not sufficient. Even "conductive" oils are still relatively high in resistance and therefore not a viable solution because of cost and excessive resistance.

Thus, a better way of electrically grounding the fluid dynamic bearing to minimize the head to disk electrical breakdown and to provide adequate grounding to the fluid dynamic bearing is desired.

SUMMARY OF THE INVENTION

In accordance with certain aspects of the present invention, a method and system for electrically grounding a Fluid Dynamic Bearing in a spindle motor assembly is described.

In one embodiment, a conductive, low resistance liquid metal is dispersed within a cavity coupled to an interface between a central shaft and a housing of the spindle motor assembly to provide a conductive path through the fluid dynamic bearing in the spindle motor assembly.

In one embodiment, the conductive low resistance liquid metal is dispersed within lubricating oil in the fluid dynamic bearing to provide the conductive path between the spindle shaft and the spindle housing.

In one embodiment, the conductive low resistance liquid metal serves as the lubricant of the fluid dynamic bearing without any oil.

BRIEF DESCRIPTION OF THE DRAWINGS

The accompanying drawings, which are incorporated in and form a part of this specification, illustrate embodiments of the presented technology and, together with the description, serve to explain the principles of the presented technology. Unless specifically noted, the drawings referred to in this description should be understood as not being drawn to scale.

DETAILED DESCRIPTION

Reference will now be made in detail to the alternative embodiments of the present technology. While some of the present technology will be described in conjunction with the alternative embodiments, it will be understood that they are not intended to limit the present technology to these embodiments. On the contrary, embodiments of the present technology are intended to cover alternatives, modifications and equivalents, which may be included within the spirit and scope of the embodiments as defined by the appended claims.

Furthermore, in the following detailed description, numerous specific details are set forth in order to provide a thorough understanding of embodiments of the present technology. However, it will be recognized by one of ordinary skill in the art that embodiments may be practiced without these specific details. In other instances, well known methods, procedures, components, and circuits have not been described in detail as not to unnecessarily obscure aspects of embodiments of the present technology.

Figure 1:
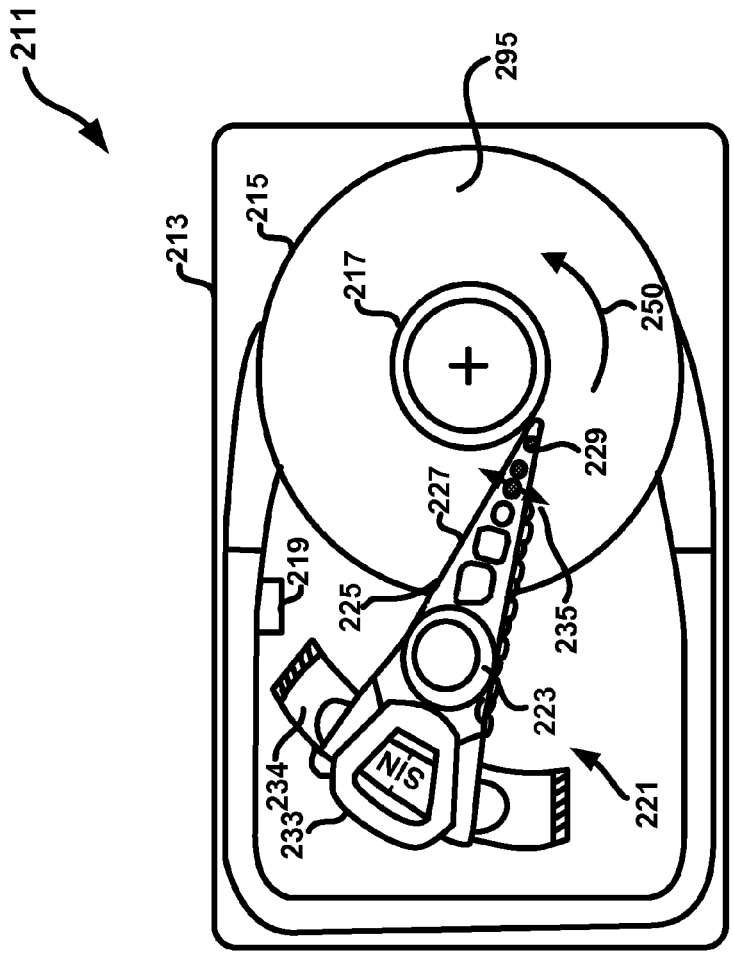
FIG. 1 is a schematic top plan view of an example hard disk drive in accordance with one embodiment of the present invention.

FIG. 1 shows a schematic drawing of one embodiment of an information storage system comprising a magnetic hard disk file or drive 211 for a computer system. Hard disk drive 211 has an outer housing or base 213 containing a disk pack having at least one media or magnetic disk 215. The disk pack (as represented by disk 215) defines an axis of rotation and a radial direction relative to the axis in which the disk pack is rotatable. A spindle motor assembly having a central shaft 217 operates as this axis and rotates disk 215, or disks of the disk pack, in the circumferential direction shown by arrow 250, relative to housing 213. An actuator 221 comprises a plurality of parallel actuator arms 225 (one shown) in the form of a comb that is movably or pivotally mounted to base/housing 213 about a pivot assembly 223. A controller 219 is also mounted to base 213 for selectively moving the comb of arms 225 relative to the disk pack (as represented by disk 215).

In the embodiment shown in FIG. 1, each arm 225 has extending from it at least one cantilevered integrated lead suspension (ILS) 229. The ILS 229 may be any form of lead suspension that can be used in a data access storage device, such as a hard disk drive (HDD). A slider (not shown) is usually bonded to the end of ILS 229, both of which are attached to suspension 227. Suspension 227, in one embodiment, is used as a pathway to provide an electrical connection to the slider. In one embodiment, portions of the slider are electrically isolated from ground, and in some embodiments, are also electrically isolated from suspension 227. The level of integration containing the slider, suspension, ILS, and read/write head (not shown) is called the Head Gimbal Assembly (HGA).

The ILS 229 has a spring-like quality, which biases or presses the air-bearing surface of the slider toward disk 215 to cause the slider to fly at a precise distance from disk 215. ILS 229 has a hinge area that provides for the spring-like quality, and a flexing interconnect that supports read and write traces and electrical connections through the hinge area. A voice coil 233, free to move within a conventional voice coil motor magnet assembly 234 (top pole not shown), is also mounted to actuator arms 225 opposite the head gimbal assemblies. Movement of the actuator 221 (indicated by arrows 235) by controller 219 causes the head gimbal assemblies to move along radial arcs across tracks on the surface 295 of disk 215 until the heads settle on their set target tracks. The head gimbal assemblies operate in a conventional manner and move in unison with one another, unless drive 211 uses multiple independent actuators (not shown) wherein the arms move independently of one another.

The HDD in FIG. 1 includes a fluid dynamic bearing motor that has a spindle supported by two hydrodynamic journal bearings and two hydrodynamic thrust bearings. The hydrodynamic journal and thrust bearings are formed between a shaft and thrust plate and a sleeve with the controlled clearance filled with lubricant. The lubricant is typically a few microns in thickness. The bearings have a specially designed herringbone or other type of groove pattern to provide stable operation of the spindle.

Figure 2:
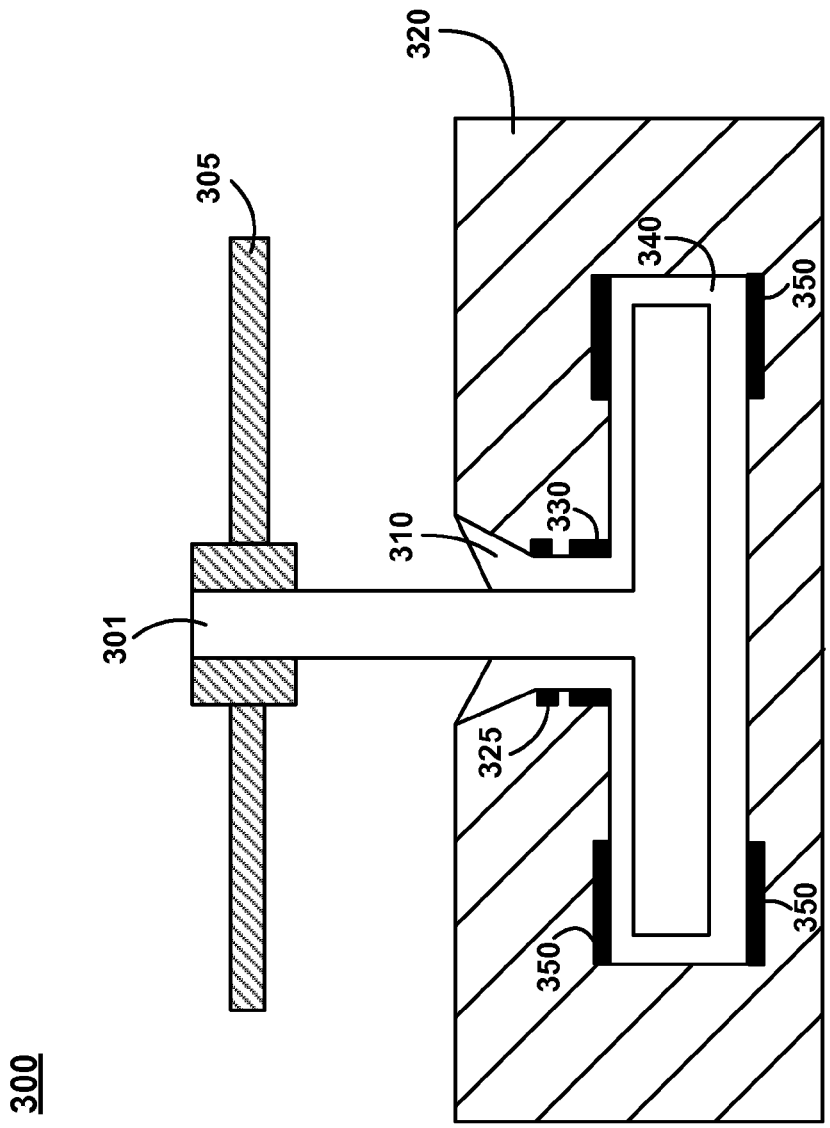
FIG. 2 is a cross sectional view of a Fluid Dynamic Bearing in accordance with one embodiment of the present invention.

FIG. 2 is a cross sectional view of a Fluid Dynamic Bearing 300 in accordance with one embodiment of the present invention. In FIG. 2, disk pack 315 is shown disposed upon central shaft 301. The level of integration comprising disk pack 315 and central shaft 301 is also called the rotor and base 320 is called the stator. As shown in FIG. 2 central shaft 301 extends into a cavity 340 formed in base 320. In embodiments of the present invention, the space between base 320 and central shaft 301 is filled with a lubricant 310 in which central shaft 301 is suspended. In other words, central shaft 301 is held away from the sides of base 320 by lubricant 310. In operation, lubricant 310 also creates fluid dynamic pressures as central shaft 301 is rotated around an axis of rotation which serves to stabilize central shaft 301 within base 320 and to reduce friction between central shaft 301 and base 320. In other words, groove patterns provide radial and angular (tilt) stability to the rotor. FIG. 2 also depicts bearing 325, capillary buffer 330, and thrust bearings 350.

In the past, magnetic hard disk drives used ball bearings to reduce the friction between central shaft 301 and base 320. However, as central shaft 301 rotates, and particularly at higher rotation speeds, ball bearings can vibrate excessively, thus inducing non-repeatable run-out (NRRO). This causes a relatively large amount of vibration (e.g., approximately 1μ) in some instances. The use of ball bearings in magnetic hard disk drives has the additional disadvantage of being relatively noisy in operation.

As a result of the disadvantages listed above, most magnetic hard disk drives utilize FDBs. In many FDBs, regions of base 320 surrounding central shaft 301 are grooved.

There is a top grooved region and a bottom grooved region which surround central shaft 301. The grooves are generally V-shaped and are frequently referred to as having a herringbone pattern.

In operation, as central shaft 301 rotates around its axis of rotation, the grooves cause a build-up of pressure in lubricant 310 in the region between central shaft 301 and top grooves. The bottom grooves creates a second region in which there is a build-up of pressure in lubricant 310 between central shaft 301 and the bottom grooves. Thus, central shaft 301 is stabilized in an X/Y plane of movement, i.e., radically.

Figure 3:
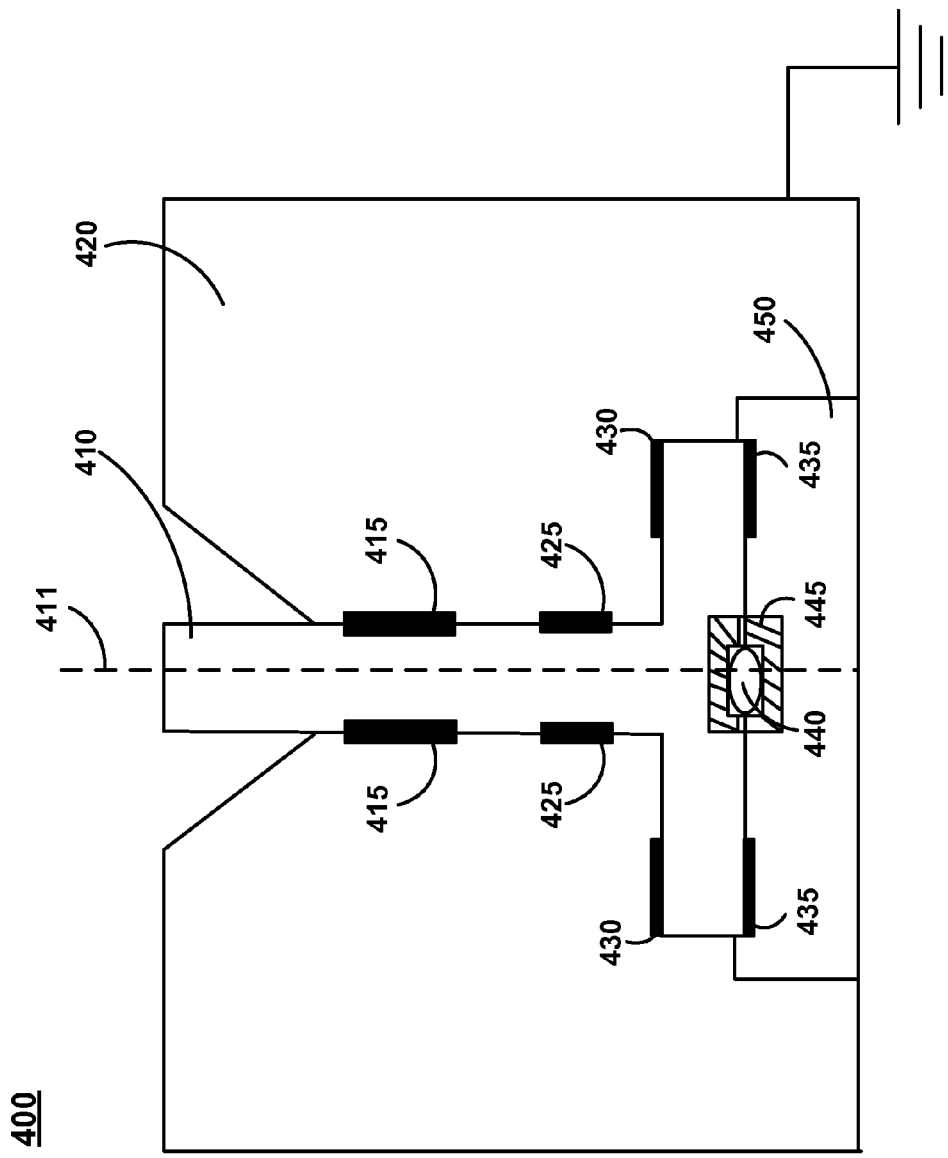
FIG. 3 is a cross sectional view of an electrically grounded rotating shaft full fill type Fluid Dynamic Bearing of one embodiment of the present invention.

FIG. 3 illustrates a cross section view through a Rotating Shaft Full fill type Fluid Dynamic Bearing of one embodiment of the present invention. The embodiment shown in FIG. 3, includes a liquid metal enclosure 445. The liquid metal enclosure 445 is trapped in a cavity made of a conducting material such as carbon. This is done to protect the stainless steel thrust plate bearing 435. The liquid metal 440 provides a metallic contact that is more conductive than what oil additives offer without the introduction of conducting particles. The liquid metal 440 also provides a high electrical conductivity and a mechanical compliance by participating in rotor dynamics (axial about axis 411, radial and tilting motions) without losing electrical contact. FIG. 3 also depicts base 420, capillary buffer 425 and thrust bearings 430.

The low thrust bearing 435 is in one embodiment, a spiral herringbone pattern applied to the bottom thrust plate 450 of the FDB 400. In one embodiment, the rotor 415 is completely smooth (no pattern). The cylindrical shaft has two radial herringbone groove patterns in which resides excess oil in the capillary buffer 425.

In manufacturing the FDB 400 shown in FIG. 3, a thrust washer is swaged and glued or laser welded to the FDB 400 cartridge. In one embodiment, the liquid metal 440 is trapped in a liquid state in a captive nest in the thrust washer. In one embodiment, the liquid metal 440 is pressure-dispensed inside the captive nest. That way, the liquid metal 440 will not separate from the thrust washer. In one embodiment a heater may be used in cold environments to heat the liquid metal 440 to ensure that the liquid metal 440 stays liquid even when the outside temperature dips below the freezing point of the liquid metal 440.

Figure 4:
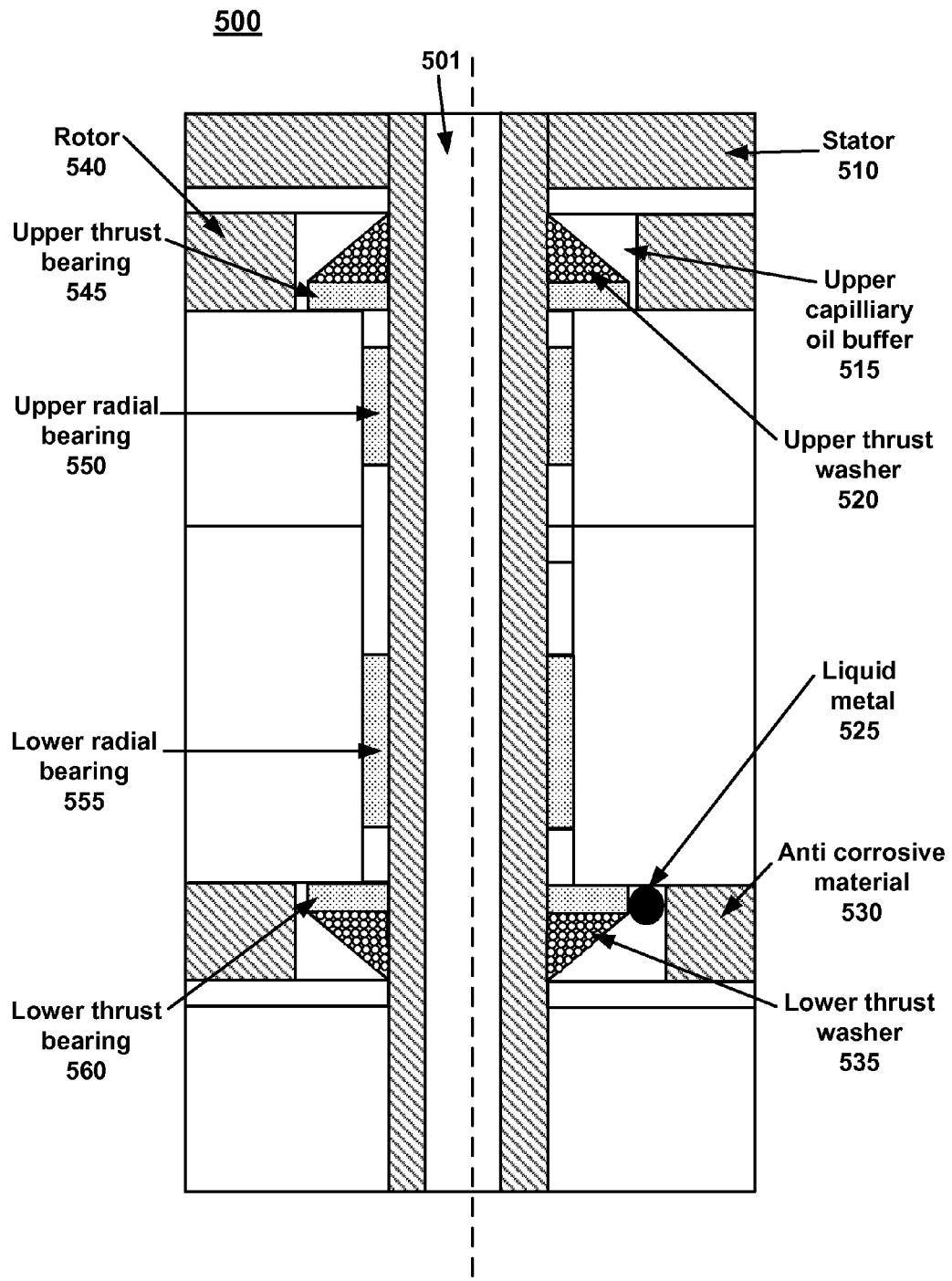
FIG. 4 is a cross sectional view of one embodiment of grounding a non-rotating shaft type Fluid Dynamic Bearing of one embodiment of the present invention.

In one embodiment, the anti-corrosion material 530 of FIG. 4 may not be needed if a low corrosion rate of Galinstan material is in contact with the stainless steel. In one embodiment the liquid metal 440 may be trapped and stabilized on top of the capillary oil buffer with the additional benefit of suppressing oil evaporation.

In yet another embodiment, the lubricating oil in the fluid dynamic bearing may be replaced by the liquid metal 440 to provide both lubrication and electrical grounding to the spindle motor shaft 410. The liquid metal 440 may also be dispersed within the lubricating oil as metallic blobs to provide a conductive path between the shaft and the base 450.

In one embodiment, the material comprising the liquid metal 440 may be a Galinstan alloy such as Gallium, Indium, and Tin (Stannum). In one embodiment the weight composition of these materials may be about 66%, 20.5% and 15.5%.

FIG. 4 illustrates a cross section view through a non-rotating type Fluid Dynamic Bearing 500 of one embodiment of the present invention. The embodiment shown in FIG. 4, includes a liquid metal blob 525. In one embodiment, the shaft 501 is fixed in the spindle motor housing. As shown in FIG. 4, in one embodiment the liquid metal blob 525 is disposed within the spindle motor housing between the central shaft 501 and the anti-corrosion material 530 and the lower thrust bearing 560. FIG. 4 also depicts stator 510, upper capillary buffer 515, upper thrust washer 520, lower thrust washer 535, upper thrust bearing 545, upper radial bearing 550 and lower radial bearing 555.

In the embodiment shown in FIG. 4, in order to electrically ground a motor with non-rotating shaft type, the liquid metal 525 is subjected to a higher shear than in a rotating shaft full fill type motor illustrated in FIG. 3. The advantage of the embodiment in FIG. 4 is that the chosen location of the liquid metal 525 is that centrifugal forces trap the liquid metal 525 very effectively (its density is about 6 g/cm$^3$) and thereby provide electrical grounding comparable to that provided in FIG. 3. In one embodiment, the liquid metal 525 may be a highly conductive fluid at room temperature that may be heated by the rotation of the drive. In one embodiment the liquid metal 525 is a low resistance metallic material. In another embodiment, the liquid metal 525 may be dispersed at multiple points within the spindle motor housing between the central shaft and the rotor 540.

Figure 5:
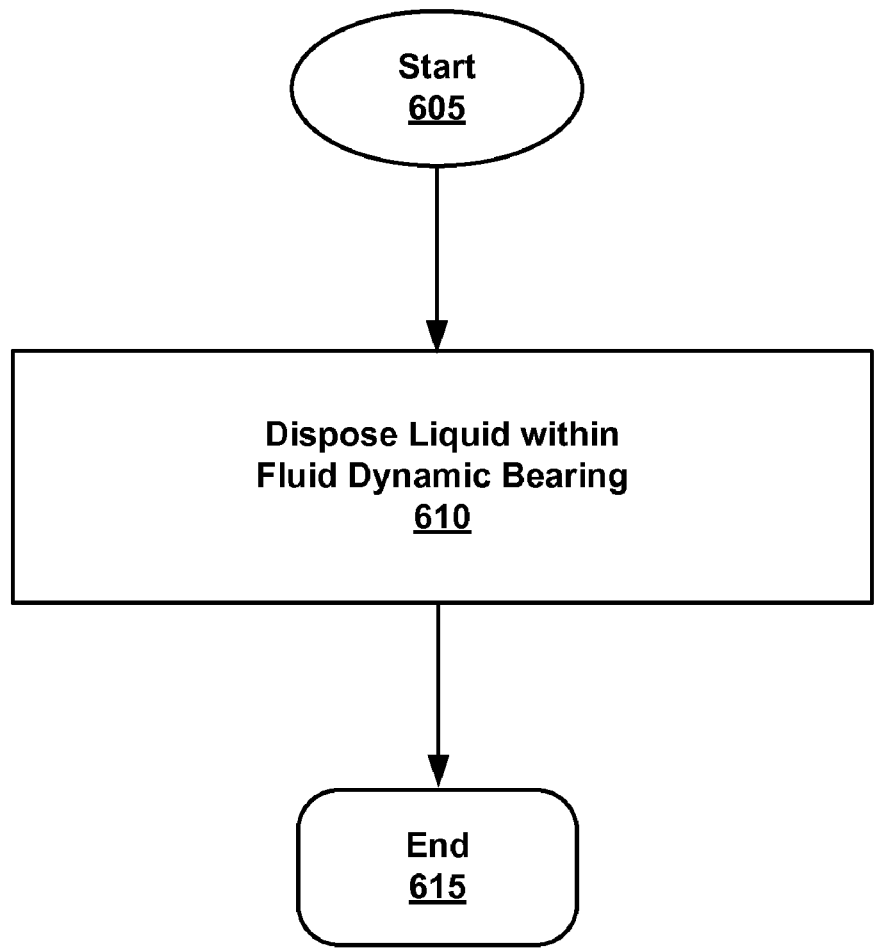
FIG. 5 is a flowchart of a method for electrically grounding a Fluid Dynamic Bearing in accordance with embodiments of the present invention.

FIG. 5 is a flowchart of a method 600 for electrically grounding a fluid dynamic bearing motor in accordance with embodiments of the present invention. In block 605, the method starts. In block 610 of FIG. 5, at least one contoured region comprising at least one defined edge for capturing a liquid metal is fabricated within a capillary buffer. As discussed above, embodiments of the present invention utilize a contoured region within a spindle housing to store the liquid metal along the bottom wall or side walls of the central shaft. In embodiments of the present invention, the contoured region comprises at least one defined edge for storing the liquid metal in response to centrifugal force created when central shaft is rotating around its axis of rotation. In block 615, the method ends.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hard disk drive comprising:
 a housing comprising grooved regions surrounding portions of a central shaft;
 a disk pack coupled with the central shaft disposed within a fluid dynamic bearing, said disk pack defining an axis of rotation and a radial direction relative to said axis; and
 an electrical grounding material coupled to the central shaft to provide a conductive path through the fluid dynamic bearing to the disk pack;
 wherein the electrical grounding material comprises a liquid metal; and
 wherein a thrust washer is swaged and glued or laser welded to the housing, and the liquid metal is trapped in a liquid state in a captive nest in the thrust washer.

2. The hard disk drive as recited in claim 1, wherein the captive nest is adjacent a base of the central shaft interfacing with the thrust washer.

3. The hard disk drive as recited in claim 2, wherein the fluid dynamic bearing comprises lubricating oil.

4. The hard disk drive as recited in claim 3, wherein the grounding material further comprises a material dispersed within the lubricating oil to provide a conductive path to the central shaft and the housing.

5. The hard disk drive as recited in claim 1, wherein the liquid metal is of electrically low resistance.

6. The hard disk drive as recited in claim 1, wherein the liquid metal is Galinstan.

7. The hard disk drive as recited in claim 1, wherein the liquid metal comprises Indium.

8. The hard disk drive as recited in claim 1, wherein the liquid metal comprises Stannum.

* * * * *